Figures 1, 2:
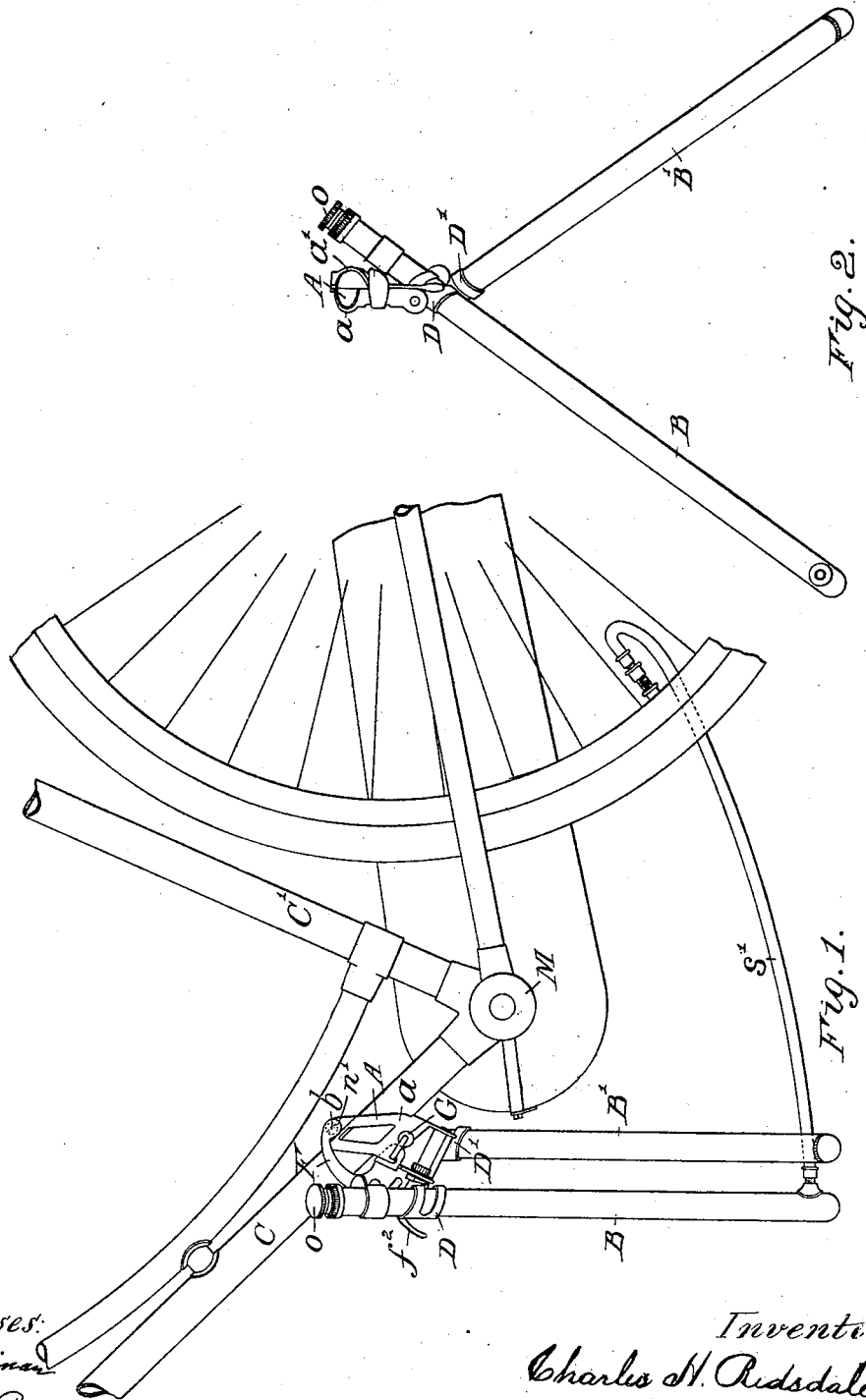

No. 631,998. Patented Aug. 29, 1899.
C. H. RIDSDALE.
BICYCLE SUPPORT.
(Application filed Feb. 17, 1898.)
(No Model.) 6 Sheets—Sheet 1.

Witnesses:

Inventor:
Charles H. Ridsdale
by Henry Connett
Attorney

No. 631,998. Patented Aug. 29, 1899.
C. H. RIDSDALE.
BICYCLE SUPPORT.
(Application filed Feb. 17, 1898.)
(No Model.) 6 Sheets—Sheet 2.
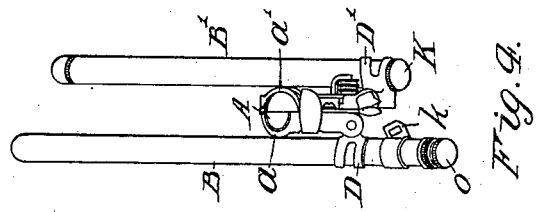
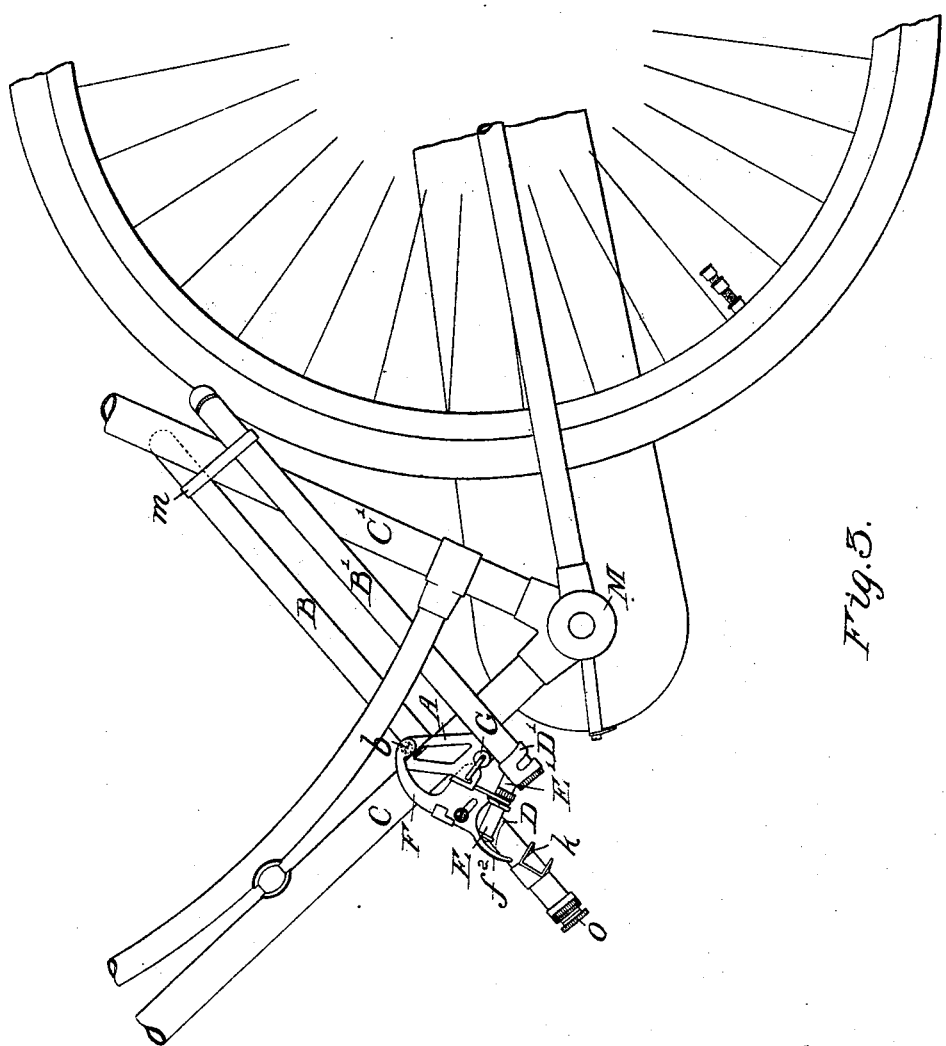
Witnesses: Inventor:
Charles H. Ridsdale
by Henry Connett
Attorney
THE NORRIS PETERS CO., PHOTO-LITHO., WASHINGTON, D. C.

No. 631,998. Patented Aug. 29, 1899.
C. H. RIDSDALE.
BICYCLE SUPPORT.
(Application filed Feb. 17, 1898.)
(No Model.) 6 Sheets—Sheet 3.
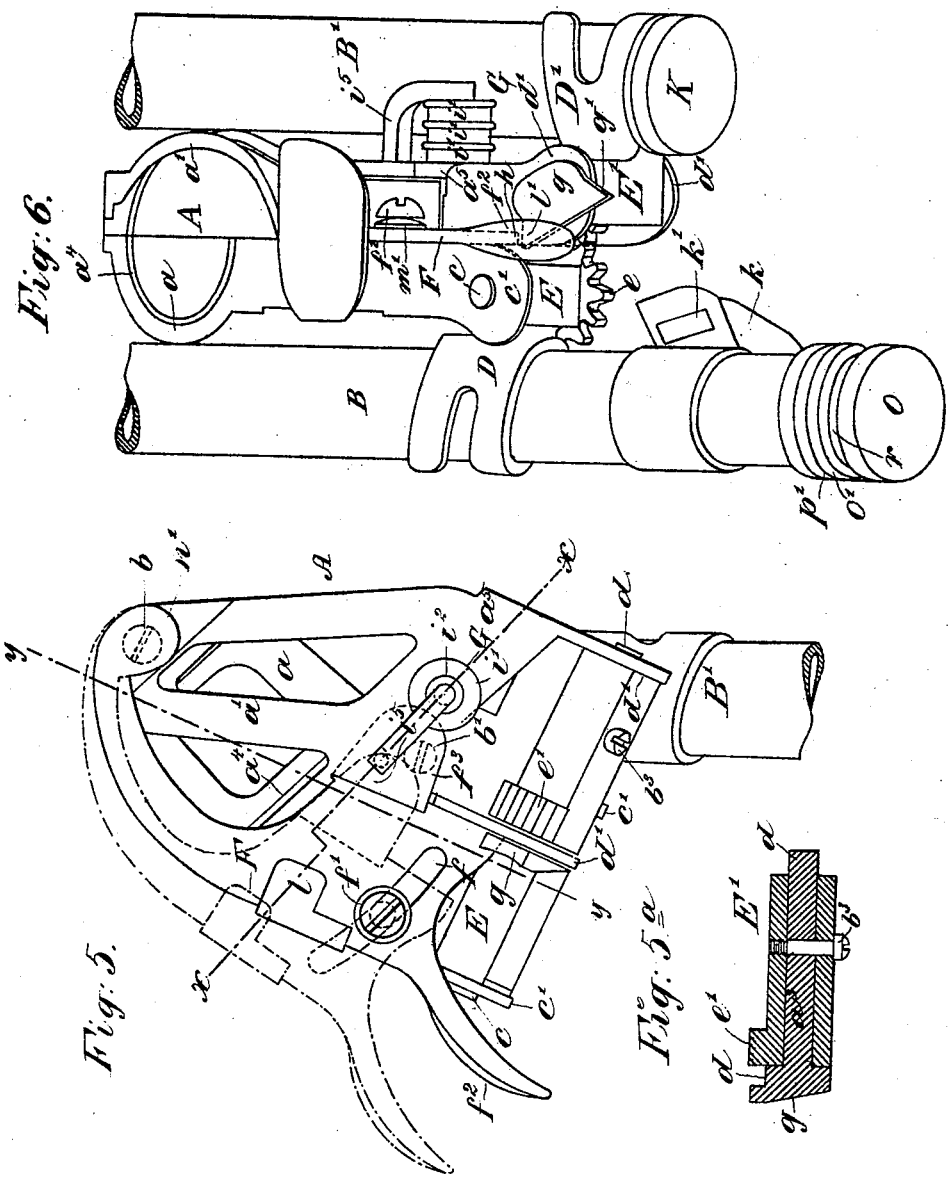
WITNESSES:
INVENTOR
Charles H. Ridsdale
BY
Henry Connett
ATTORNEY
THE NORRIS PETERS CO., PHOTO-LITHO., WASHINGTON, D. C.

No. 631,998. Patented Aug. 29, 1899.
C. H. RIDSDALE.
BICYCLE SUPPORT.
(Application filed Feb. 17, 1898.)
(No Model.) 6 Sheets—Sheet 4.
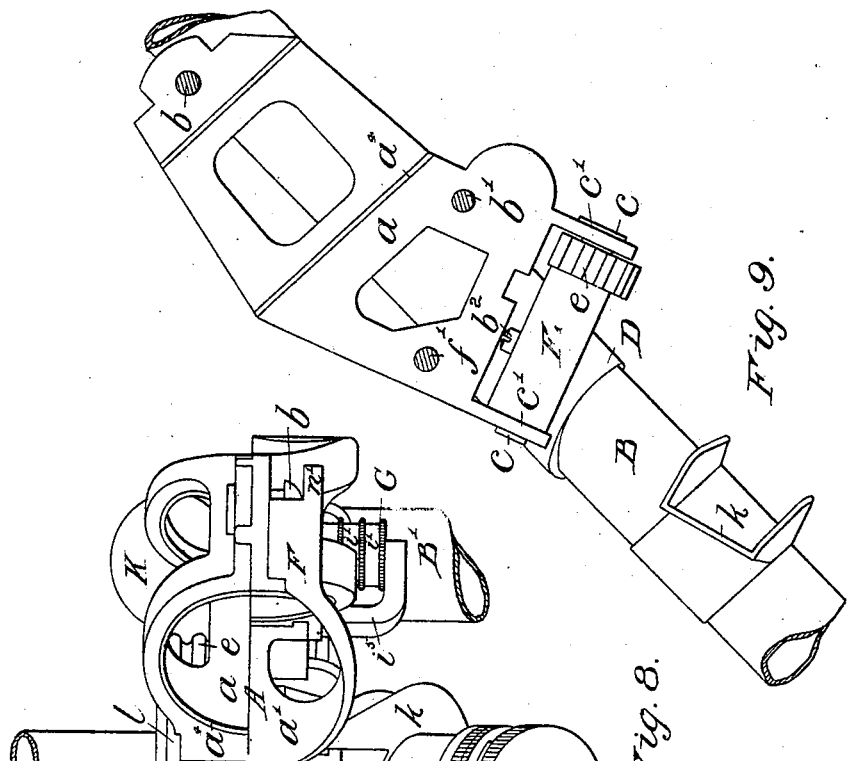
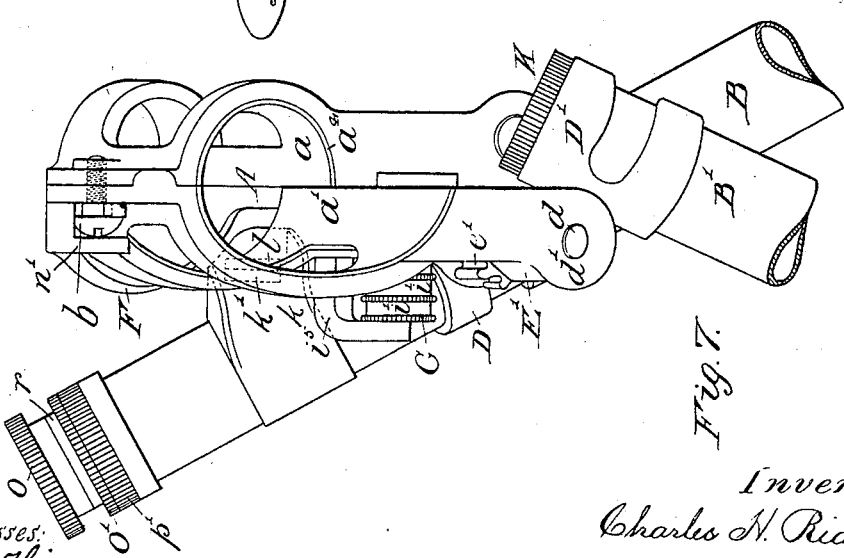
Witnesses:
Inventor:
Charles H. Ridsdale
by Henry Connett
Attorney
THE NORRIS PETERS CO., PHOTO-LITHO., WASHINGTON, D. C.

No. 631,998. Patented Aug. 29, 1899.
C. H. RIDSDALE.
BICYCLE SUPPORT.
(Application filed Feb. 17, 1898.)
(No Model.) 6 Sheets—Sheet 5.
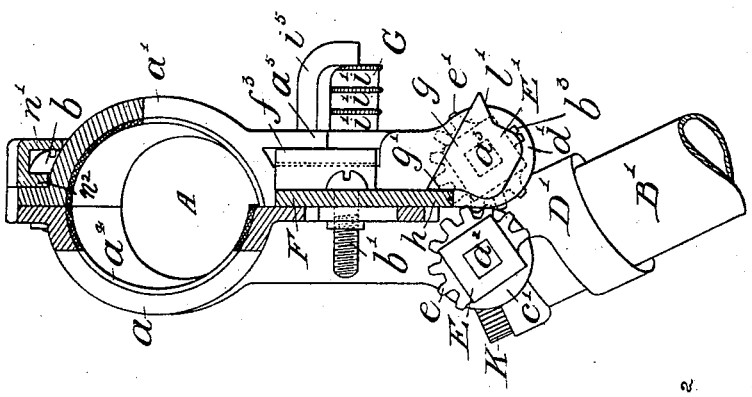
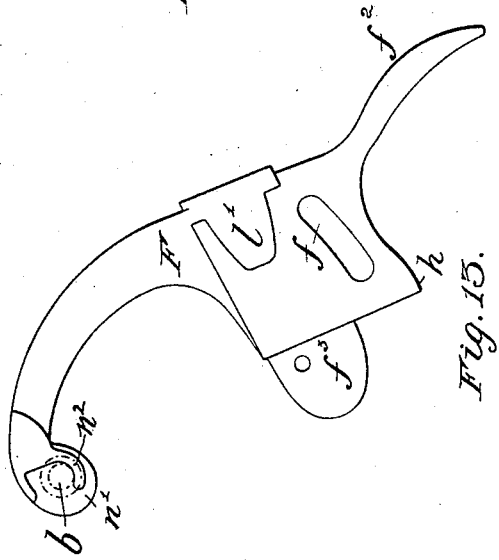
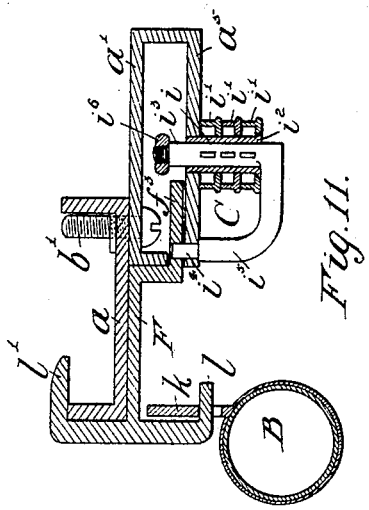
Witnesses:
Inventor:
Charles H. Ridsdale
By Henry Connett
Attorney
THE NORRIS PETERS CO., PHOTO-LITHO., WASHINGTON, D. C.

No. 631,998. Patented Aug. 29, 1899.
C. H. RIDSDALE.
BICYCLE SUPPORT.
(Application filed Feb. 17, 1898.)
(No Model.) 6 Sheets—Sheet 6.
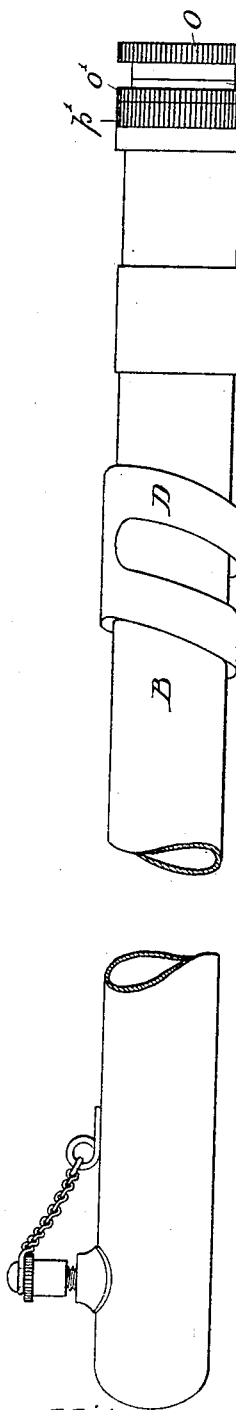
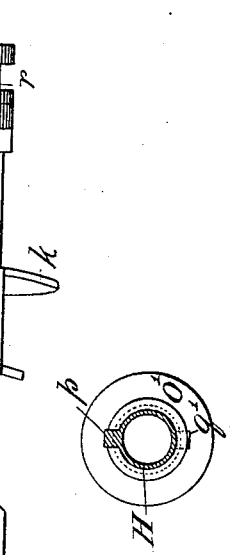
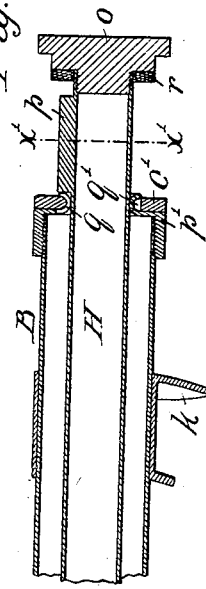
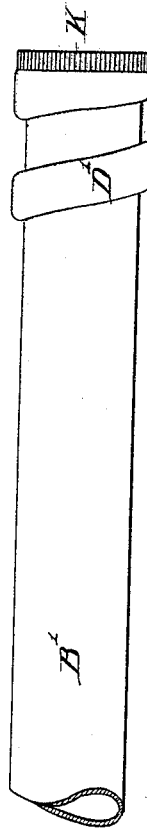
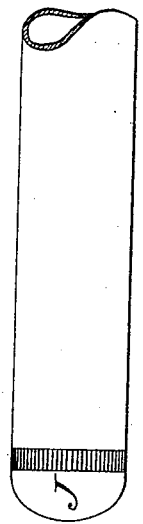
Witnesses
Peter A. Ross
Inventor:
Charles H. Ridsdale
Attorney
THE NORRIS PETERS CO., PHOTO-LITHO., WASHINGTON, D. C.

United States Patent Office.

CHARLES H. RIDSDALE, OF GUISBOROUGH, ENGLAND.

BICYCLE-SUPPORT.

SPECIFICATION forming part of Letters Patent No. 631,998, dated August 29, 1899.

Application filed February 17, 1898. Serial No. 670,619. (No model.)

*To all whom it may concern:*

Be it known that I, CHARLES HENRY RIDSDALE, a subject of the Queen of Great Britain, residing at Hutton, Guisborough, in the county of York, England, have invented certain Improvements in Bicycle-Supports, of which the following is a specification.

This invention relates to means for supporting a bicycle in an upright position when at rest and in connection therewith means for utilizing the hollow legs of the support as a tire-pump and a receptacle, respectively, and means for locking the bicycle against being wheeled away by unauthorized persons.
In carrying out this invention in its entirety two hollow or tubular legs are employed, one being fitted up as a tire-pump and the other, for example, as a receptacle for articles needed by the rider, and these legs are connected by a clip to the cycle-frame and preferably to the lower member thereof in front of and near the crank-hanger, so that when the said legs are down in supporting position and locked fast they will be in the path of the cranks or pedals, and thus prevent the bicycle from being wheeled away when the legs are down. The legs are pivotally connected to the clip, so that when down they diverge laterally like the letter A, and they are geared together at their pivots, so that they move together when turned up or down. Each leg is rigidly connected to its shaft, which carries the gear, so that they stand out laterally clear from the cycle-frame, and the two legs are in different planes, taken at right angles to the hinging-axes, so that when they are turned down and diverge laterally at their lower ends their upper ends, which are or may be prolonged above the hinging-axes, may not interfere with each other or with the member of the cycle-frame to which the clip is secured.

In the accompanying drawings, which illustrate an embodiment of the invention in its preferred form, Figure 1 is a side elevation of a part of a drop-frame bicycle, showing the support, on a small scale, with the legs turned down and in supporting position. Fig. 2 is a front elevation of the support as seen in Fig. 1 and on the same scale. Figs. 3 and 4 are views corresponding, respectively, to Figs. 1 and 2, on the same scale, but showing the legs folded up. Fig. 5 is a side elevation of the device on a larger scale than the principal views and showing only the parts adjacent to or at the clip and hinging axes, and Fig. $5^a$ is a detached axial sectional view of the hinging spindle and sleeve. Fig. 6 is a front view of the parts seen in Fig. 5. This view shows the legs folded up, while in Fig. 5 the farther leg is shown as turned down, the nearer leg being broken away or omitted to avoid obscuring the other parts. Fig. 7 is a rear view of the parts seen in Fig. 6, and Fig. 8 a plan thereof. Fig. 9 is a view showing the inner face of that half or section of the securing-clip to which the leg that is utilized as a tire-pump is hinged, and Fig. 10 is a similar view showing the inner face of the other section of the clip. Fig. 11 is a section of the clip and locking devices, taken in the plane designated by the line $x\,x$ in Fig. 5. Fig. 12 is a vertical section in the plane designated by the line $y\,y$ in Fig. 5. Fig. 13 is a side view of the swing-bolt used for securing the legs in their positions. Fig. 14 is a side elevation of the leg utilized as a tire-pump. Fig. 15 is an axial section of the upper end of the same; and Fig. 16 is sectional end view, the plane of the section being designated by line $x'\,x'$ in Fig. 15. Fig. 17 is a side elevation, and Fig. 18 an axial section, of the leg used as a receptacle.

A is the clip through which the two tubular legs B and B' are connected to the cycle-frame. This clip is in two sections or halves $a$ and $a'$, shaped to embrace the cylindrical member of the cycle-frame and secured together firmly when in place by screws $b$ and $b'$. Within the clip is soft material $a^4$, as rubber, to interpose between the metal of the clip and cycle-frame. The respective legs are secured fixedly in sockets or embracing-collars D and D', and these collars are respectively connected rigidly to two short sleeves E and E', fixed, respectively, by screws $b^2$ and $b^3$ on two spindles $a^2$ and $a^3$, which are here shown as square. The journals $c$ of the spindle $a^2$ find bearings $c'$ in the section $a$ of the clip, and the journals $d$ of the spindle $a^3$ find bearings $d'$ in the section $a'$ of the clip. The axes of these spindles are parallel, and the sleeves E and E' are geared together by intermeshing gear-teeth $e$ and $e'$ on the respective sleeves, as best seen in Fig. 12. By this construction both legs are caused to fold up or turn down in unison. The collars D and D', which embrace the respective legs, are not placed opposite to each other, but so that when the legs are turned down, Figs. 2 and 7, the upper prolongation or prolongations of the legs above their points of attachment may not interfere with each other, and the said collars are attached, Figs. 4 and 6, to the respective sleeves E and E' tangentially to said sleeves and the shafts at points which will be outward or on the outer sides thereof when the legs are folded up, so that when in this position there will be sufficient space between the legs to accommodate the members of the cycle-frame. When the legs are turned down, these points of attachment are brought inward, as indicated. This construction permits the spindles to be placed close together and gears of small diameter to be used. In fact, when the legs are down they cross obliquely at their upper ends like the letter X and when folded up they are parallel and embrace the seat member or pillar C' of the cycle-frame, to which they may be secured, if desired, by a strap $m$, as seen in Fig. 3. It is convenient to construct the two hinging-shafts by which the legs are connected to the clip of spindles, with sleeves fixed thereon, the sleeves carrying the gear-wheels; but this detail of construction is not material to the invention.

To secure the legs B and B' in position when set, a swing-bolt F, Figs. 5 and 13, is employed. This bolt is hinged to the clip A by the screw $b$ and has a curved guide-slot $f$, in which is a limiting guide pin or screw $f'$, and it is also furnished with a thumb-piece $f^2$, by which it can be conveniently manipulated. To form the securing device for the legs, the spindle $a^3$ has formed on its end a cam-piece $g$, Figs. 5, 5$^a$, 6, and 12, and when the legs are down in supporting position, as in Fig. 12, they may be secured in that position by pressing in the bolt F so as to bring its rear locking-lip $h$ up to the bearing $d'$ and close to a plane vertical face $g'$ on the cam-piece $g$ and between this face and the inner face of the section $a$ of the clip. This prevents rotation of the spindles, and consequently the shifting of the legs. In Fig. 5 the full lines show the bolt in its operative position and the dotted lines show it in its inoperative position. When in its operative position, it may be secured against manipulation by unauthorized persons by any suitable lock, but preferably by a combination-lock G. (Seen best in Fig. 11.) A box is formed on the clip-section $a'$ by a plate $a^5$, and fixed on this plate is the tube $i$, about which turn the lock-disks $i'$, said tube having a keeper $i^2$ at its outer end to hold the disks in place. One branch $i^3$ of the staple-bolt of the lock passes through the tube $i$ into the hollow of the box, and on the inner end of this branch is a stop-collar $i^6$, which permits the bolt sufficient play for unlocking, but which prevents its entire disengagement from the lock. The other branch $i^5$ of the staple-bolt has a locking-pin $i^4$, which passes through a bolt-hole in the plate $a^5$ and through a bolt-hole also in a projecting lip $f^3$ of the swing-bolt F when the latter is in operative position, said flange or lip $f^3$ entering the box through a slot or way in the end of the same and playing in said slot. The legs when secured in their operative supporting position cannot of course be spread apart; but they may be brought closer together at their feet, so as to raise the cycle a little and lift and hold the front wheel thereof off from the ground. This is a convenience when cleaning the cycle.

The legs B B' may be secured by the swing-bolt F when they are folded up. To effect this, a projection $l'$ is formed on the cam-piece $g$, which is so placed as to take the position seen in dotted lines in Fig. 6 when the legs are folded up, the locking-lip $h$ on the bolt F taking directly over said projection and preventing the outward rotation of the spindles necessary to bring the legs down. To hold the swing-bolt F frictionally wherever set, a thin steel cup-washer $m'$, Fig. 6, may be placed under the head of the head of the guide-pin $f'$.

The swing-bolt F has at its hinging end, Figs. 12 and 13, a guard-plate $n'$, which takes over and screens the head of the screw $b$, and also a curved or hooked piece $n^2$, which stands off from the face of the plate $n'$ a distance slightly greater than the thickness of the head of the screw $b$. In Fig. 13 the body and head of the screw $b$ are indicated by dotted circles. The hooked piece $n^2$ is made to take about the body of the screw $b$ between the head of the latter and the part in which the screw is set, and the plate $n'$ then takes position over the head of the screw and screens it from view and access. When the piece $n^2$ is hooked about the screw $b$, the bolt F is swung or turned into position to receive the guide-pin $f'$ and the latter is placed. The hooked piece $n^2$ now prevents the bolt F from being disengaged from the screw $b$; also, the part $f^3$ of the bolt F is cranked out or offset, so that it screens the head of the screw $b'$ and prevents this screw from being tampered with. The positions of these parts are seen in Fig. 11 and also in Fig. 5, where the screw $b'$ is represented in dotted lines. Thus it will be seen that when the swing-bolt F is in its operative position and locked the clip A cannot be removed by the withdrawal of the screws $b$ and $b'$, and when the clip is mounted, as shown in Fig. 1, near to the crank-hanger M the legs will be in the way of the cranks, so that the cycle cannot be wheeled away while the legs are down whatever may be the character of the ground on which it stands.

The hollow leg B serves also for use as the barrel of a pump for inflating the tire, as seen in Fig. 1, wherein $s'$ indicates the rubber tube connecting the pump with the nipple of the tire-valve. In such use the leg does not require to be detached from the cycle; but merely to be turned down to the supporting position. The upper end of the leg extends some distance above the securing-collar D when the leg is so turned down, and it is in the end of this prolongation that the pump-rod plays. Figs. 14, 15, and 16 illustrate the details of the pump on a conveniently large scale. In these views, H is the pump-rod, provided at its outer end with a handle $o$ and playing through an aperture in the cover $p'$ of the barrel. In order to limit the inward movement of the rod in pumping, and thus prevent the fingers from being pinched between the handle $o$ and the end of the barrel, and at the same time allow the handle to be pressed down close to the cover $p'$ and secured when the pump is not in use, a limiting-stop and a securing device are employed, and these will now be described. A rotatively-mounted apertured disk $o'$ is mounted on the cover $p'$, and this disk may be conveniently held in place by spinning over the thin metal of the cover around the margin of the opening in the latter onto the disk, as shown. In the inner margin of the disk $o'$ is formed a notch or keyway $q'$, and in the cover $p'$ is formed a similar notch or keyway $q$. These keyways may be put into coincidence or register by rotating the disk $o'$. On the pump-rod H, near the handle $o$, is fixed a key or spline $p$ of such size that it will pass through the keyways $q$ and $q'$ when they register and of such length as to form a distancing-piece to limit the approach of the handle $o$ to the cover $p'$. This key prevents the pump-rod from being pressed down far enough to pinch the fingers of the user, provided the keyways are not in register, or if in register they are not in the line of movement of the key $p$, as the latter will then strike the disk $o'$, and thus prevent the handle $o$ from approaching too near the head of the pump-barrel; but when the device is not in use as a pump the keyways or notches are made to register, the pump-rod turned until the key $p$ is alined with them, and the pump-rod pushed in until the key passes entirely through the cover, and a soft packing $r$ under the handle bears on the disk $o'$ and is slightly compressed. The pump-rod is now turned enough to put the key $p$ out of register with the keyways, and the disk $o'$ is turned enough to put its own keyway out of register with the keyway in the cap, when the pump-rod will be held from falling out and the looseness of the parts will be taken up by the packing $r$. Where the leg B is to be used as a pump, when turned down it is desirable to brace it so that it will stand the strain, and this bracing is effected by the means now to be described.

On the inner side of the upward prolongation of the leg B is fixed a lug $k$, Figs. 11, 14, and 15, which has in it an aperture $k'$. When the leg is turned down, this aperture $k'$ comes into the position seen in dotted lines in Fig. d in section in Fig. 11, and as the swing-bolt F is closed in a lug $l$ thereon, Fig. 5, enters said aperture, and thus forms a brace to steady the leg. On the opposite side of the bolt F is another lug $l'$, Figs. 11 and 13, which at the same time takes snugly behind the outer edge of a flange on the clip-section $a$, and this lug consequently relieves the guide-pin $f'$ of a portion of the outward pull of the upper end of the pump when the legs are turned down and secured. When the leg B is turned down, its upper end comes in front of the screw $f'$ and prevents it from being tampered with; but even if this screw were removed while the bolt F is in its operative position this bolt would still retain its position and protect the screws $b$ and $b'$, thus preventing the unfastening of the clip A.

Figs. 17 and 18 illustrate the construction of the hollow leg B', whereby it serves as a holder to receive various articles useful to a bicycle-rider. J is the removable foot of the leg, adapted to be screwed to the latter, and K is the screw cap or cover. Within the leg may be placed a loose false bottom L, preferably flanged or cupped, as seen at $s$ in Fig. 18. In case any article should become jammed or stuck in the receptacle the foot J and cap K are removed and the false bottom L, together with the contents, pushed out with a stick.

The prolongation of the upper ends of the tubular legs beyond their hinging-points provides room for their screw-covers and also room for steadying the leg which serves as a pump, and the arrangement of the hinge-axes laterally exterior to or at the sides of the legs permits of utilizing the interiors or hollows of these legs, as described.

It will be noted by comparison of the side views Figs. 1 and 3 that the axes of the legs are fixed obliquely to the axes of the turning shafts or spindles, whereby when they are down, Fig. 1, the legs stand substantially vertical, but when they are folded up, Fig. 3, they incline backward so as to embrace the seat-pillar C', so that they may be secured thereto.

Having thus described my invention, I claim—

1. A bicycle-support consisting of a clip or mounting to be secured to the cycle-frame, two leg-hinging shafts rotatively mounted in bearings in said clip and geared together, said shafts having their axes oblique to the axis of the clip, the legs fixed at their sides, or tangentially to the respective hinging-shafts in such manner that the axes of the legs cross the axes of their respective shafts obliquely, as shown, whereby the legs are caused to cross when turned down and to lie substantially parallel when folded, and means for securing the legs in position when turned down, substantially as set forth.

2. A bicycle-support consisting of a clip or mounting to be secured to the cycle-frame, two leg-hinging shafts rotatively mounted in said clip and geared together, the two legs secured in a tangential position to the respective shafts whereby the axes of the leg and its shaft lie in different planes, the legs crossing their respective shafts obliquely whereby the legs are caused to cross when down, and a bolt for locking the legs in either of their two positions, substantially as set forth.

3. A bicycle-support, comprising a clip or mounting adapted to be secured to the cycle-frame, and a pair of legs pivotally connected to said clip by joints which have separate pivot-axes, said legs being pivoted in positions the one forward of the other and one being hollow and having an upward prolongation beyond the pivot-axis and provided with a cover whereby its hollow interior may be utilized, substantially as set forth.

4. A bicycle-support, comprising a clip or mounting adapted to be secured to the cycle-frame, hinging-shafts mounted rotatively in bearings in the clip, and a pair of legs, one at least being tubular, secured tangentially to the respective hinging-shafts at the sides thereof which are at the outside when said legs are turned or folded up and at the inside when they are turned down, said hollow leg being provided with a removable cap whereby its hollow interior may be utilized, substantially as set forth.

5. A bicycle-support, comprising a clip or mounting adapted to be secured to the cycle-frame, a pair of legs pivotally connected to said clip so that the legs may be folded up, or turned down into operative position, gearing which compels both legs to move together, a cam-piece which turns with one of said legs, and a swing-bolt, hinged to the clip and having a locking-lip adapted to take in front of a plane face on said cam-piece and lock the legs against movement when turned down, substantially as set forth.

6. In a bicycle-support, the combination, with the clip and its securing-screws, and a supporting-leg hinged to said clip, of a swing-bolt adapted to lock said leg when turned down, said bolt having a hook $n^2$, engaging one of the clip-securing screws, a part $n'$, which screens said screw, and a slot and guide-pin, substantially as set forth.

7. In a bicycle-support, the combination, with a clip or mounting to be secured to the cycle-frame, a supporting-leg pivoted to said clip and having a cam-piece which turns with the leg, a swing-bolt hinged to the clip, said bolt having a locking-lug to interlock with said cam-piece and hold the leg against movement and a part to receive the bolt of a lock on the clip, and the said lock, substantially as set forth.

8. In a bicycle-support, the combination, with the clip, a supporting-leg pivotally attached to said clip, and the swing-bolt, hinged to the clip and adapted to lock the said leg against movement when down, said bolt having an apertured lug $f^3$, of a lock G, fixed to the clip and having a bolt which extends through the aperture in said lug and through a registering aperture in a part of the clip and locks the clip and bolt together, substantially as set forth.

9. In a bicycle-support, the combination, with a clip or mounting for attachment to the frame of the cycle, of a combined tire-pump and supporting-leg pivotally connected with such clip at a point that is below the end of the leg which is uppermost when the leg is used as a support, and provided with the pump-rod, passing out through its upper end when the pump or leg is being used as a support, substantially as described.

10. In a bicycle-support, the combination, with a clip or mounting for attachment to the frame of the cycle, and a combined tire-pump and supporting-leg pivotally connected with such clip, and provided with the pump-rod, passing out through its upper end when the pump-leg is being used as a support, a portion of the combined leg and pump extending upward from the pivot-axis thereof, and a bolt or fastening carried by the mounting and means by which it may be engaged with the upwardly-extended portion of the combined leg and pump, substantially as set forth.

11. In a bicycle-support, the combination with a clip or mounting for attachment to the cycle-frame, of a combined inflater or pump and supporting-leg pivotally connected with said clip and having a pump-rod passing out through its upper end when the pump-leg is in use as a support, said rod having a handle on its outer end, and a distancing key or piece to limit the extent of movement of the rod when operated, and the cover of the pump having a notch or keyway adapted to pass said key when put into alinement therewith, substantially as set forth.

12. In a bicycle-support, the combination, with a clip or mounting adapted to be secured to the cycle-frame, of a combined tire-pump and supporting-leg pivotally connected with said clip and provided with a pump-rod, a distancing-key $p$, on the side of said pump-rod, and a disk $o'$, mounted rotatively on the cover of the pump-barrel, said disk and cover having in them keyways, substantially as and for the purpose set forth.

13. A bicycle-support consisting of a clip or mounting adapted to be secured to the cycle-frame, two leg-hinging shafts rotatively mounted in bearings in the clip side by side, but each extending at one end some distance beyond the other, said shafts being geared together, hollow legs, having their ends which are uppermost when the legs are used as supports provided with removable caps, said legs being fixed to the respective shafts at the portions thereof respectively which extend beyond one another, whereby such ends will be clear of the hinging-shafts respectively when the legs are acting as supports, substantially as described.

14. A bicycle-support consisting of a clip or mounting adapted to be secured to the cycle-frame, two leg-hinging shafts rotatively mounted in the clip side by side, and one of them extending at one end some distance beyond the other, said shafts being geared together, legs fixed to the respective shafts, one of said legs being hollow and having a removable cap on its end which is uppermost when the leg is serving as a support, said hollow leg being fixed to that one of the shafts which projects beyond the other shaft, substantially as set forth.

15. A bicycle-support, comprising a clip or mounting adapted to be secured to the cycle-frame, a leg pivotally connected to said clip so that it may be folded up, or turned down into operative position, a cam-piece which turns with said leg, and a swing-bolt, hinged to the clip and having a locking-lip adapted to take in front of a plane face on said cam-piece and lock the leg against movement when turned down, substantially as set forth.

16. In a bicycle-support, the combination with a clip or mounting for attachment to the frame of the cycle, of a combined tire-pump and supporting-leg of which the barrel or cylinder is pivotally connected with the clip at the end of said cylinder, from which the piston-rod protrudes, whereby said rod is left free to be operated while the pump is serving as a leg, substantially as set forth.

In witness whereof I have hereunto signed my name, this 2d day of February, 1898, in the presence of two subscribing witnesses.

CHARLES H. RIDSDALE.

Witnesses:
WILLIAM COCKFIELD,
WILLIAM HUDSON.